(12) United States Patent
Jia et al.

(10) Patent No.: US 12,418,016 B2
(45) Date of Patent: Sep. 16, 2025

(54) APPARATUS, PROCESS, AND ROLLER FOR FORMING ELECTRODE PLATE

(71) Applicant: JIANGSU CONTEMPORARY AMPEREX TECHNOLOGY LIMITED, Changzhou (CN)

(72) Inventors: Hai Jia, Changzhou (CN); Shisong Li, Changzhou (CN); Kaiming Deng, Changzhou (CN); Lei Lu, Changzhou (CN); Yalong Wang, Changzhou (CN); Ruochen Wang, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 0 days.

(21) Appl. No.: 18/488,064

(22) Filed: Oct. 17, 2023

(65) Prior Publication Data

US 2024/0047642 A1 Feb. 8, 2024

Related U.S. Application Data

(63) Continuation of application No. PCT/CN2022/120647, filed on Sep. 22, 2022.

(30) Foreign Application Priority Data

Oct. 20, 2021 (CN) .......................... 202111219702.5

(51) Int. Cl.
  *B29C 43/24* (2006.01)
  *H01M 4/04* (2006.01)
  *B29C 43/46* (2006.01)

(52) U.S. Cl.
  CPC .......... *H01M 4/0435* (2013.01); *B29C 43/24* (2013.01); *B29C 43/46* (2013.01)

(58) Field of Classification Search
  CPC ....... H01M 4/0435; B29C 43/24; B29C 43/46
  See application file for complete search history.

(56) References Cited

U.S. PATENT DOCUMENTS

| | | | |
|---|---|---|---|
| 2008/0317513 A1* | 12/2008 | Sakagawa | G03G 15/0808 399/281 |
| 2011/0135405 A1* | 6/2011 | Miyaji | H10K 71/00 406/70 |

(Continued)

FOREIGN PATENT DOCUMENTS

| | | |
|---|---|---|
| CN | 1218579 A | 6/1999 |
| CN | 104835937 A | 8/2015 |

(Continued)

OTHER PUBLICATIONS

International Search Report received in the corresponding International Application PCT/CN2022/120647, mailed Dec. 15, 2022.

(Continued)

*Primary Examiner* — Ryan M Ochylski
(74) *Attorney, Agent, or Firm* — K&L Gates LLP

(57) ABSTRACT

Provided are an apparatus, process, and roller for forming electrode plate. The apparatus for forming electrode plate includes a first roller and a second roller. An inner cavity of a cylinder of the first roller is provided with a gas outlet structure, the gas outlet structure is connected to a gas supply apparatus, and surface of the cylinder of the first roller is provided with a circumferentially distributed cylinder gas discharge structure. The second roller is disposed opposite the first roller, and a gap is provided between the first roller and the second roller for rolling an electrode material into an electrode film.

8 Claims, 10 Drawing Sheets

(56) References Cited

U.S. PATENT DOCUMENTS

| | | | | |
|---|---|---|---|---|
| 2016/0141597 A1 | * | 5/2016 | Umeyama | H01M 4/139 156/62.2 |
| 2020/0075962 A1 | | 3/2020 | Shibata et al. | |
| 2021/0320288 A1 | | 10/2021 | Althues et al. | |
| 2022/0356028 A1 | * | 11/2022 | Sauer | B65H 27/00 |

FOREIGN PATENT DOCUMENTS

| | | | | |
|---|---|---|---|---|
| CN | 207061431 U | * | 3/2018 | |
| CN | 105390664 B | | 5/2018 | |
| CN | 109935913 A | | 6/2019 | |
| CN | 209466699 U | | 10/2019 | |
| CN | 110880605 A | | 3/2020 | |
| CN | 111952546 A | | 11/2020 | |
| JP | H09330707 A | | 12/1997 | |
| JP | 2016184559 A | * | 10/2016 | |
| JP | 2017094249 A | | 6/2017 | |
| JP | 2019096438 A | | 6/2019 | |
| WO | WO-2018210723 A1 | * | 11/2018 | B29C 43/006 |
| WO | 2019244566 A1 | | 12/2019 | |

OTHER PUBLICATIONS

Written Opinion received in the corresponding International Application PCT/CN2022/120647, mailed Dec. 15, 2022.
The extended European search report received in the counterpart European application 22882567.5, mailed n Jun. 21, 2024.
The First Office Action of CN Application No. 202111219702.5, mailed May 20, 2025, 21 pages with English translation.

* cited by examiner

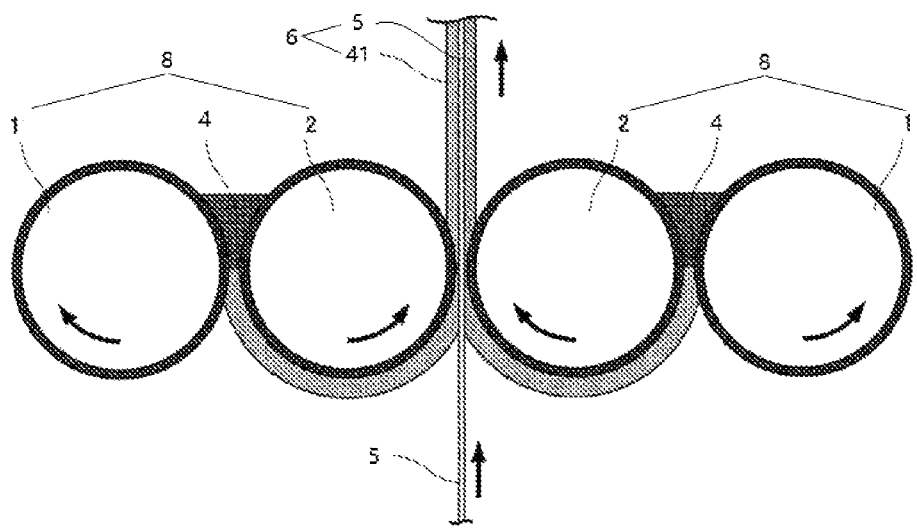

FIG. 10

| Feed an electrode material into a gap between a first roller and a second roller, where the first roller discharges gas outward through a cylinder gas discharge structure circumferentially provided on surface of a cylinder of the first roller | — S111 |
|---|---|
| Rotate the first roller and the second roller in opposite directions to roll the electrode material in the gap between the two into an electrode film | — S112 |

FIG. 11

APPARATUS, PROCESS, AND ROLLER FOR FORMING ELECTRODE PLATE

CROSS-REFERENCE TO RELATED APPLICATIONS

This application is a continuation of international application PCT/CN2022/120647, filed Sep. 22, 2022, which claims priority to Chinese Patent Application No. 202111219702.5, entitled "APPARATUS, PROCESS, AND ROLLER FOR FORMING ELECTRODE PLATE", filed on Oct. 20, 2021, which is incorporated herein by reference in its entirety.

TECHNICAL FIELD

This application relates to the field of battery technologies, and in particular, to an apparatus, process, and roller for forming electrode plate.

BACKGROUND

Energy conservation and emission reduction are crucial to the sustainable development of the automobile industry. Electric vehicles, with their advantages in energy conservation and environmental protection, have become an important part of the sustainable development of the automobile industry. For electric vehicles, battery technology is an important factor in connection with their development.

At present, in the process of processing a battery electrode plate, an electrode material needs to be first rolled into an electrode film, and then the electrode film is rolled with a substrate to form a laminated electrode plate. The electrode material is usually in a form of particles before rolling. To ensure a good rolling effect during rolling, the electrode material particles are generally required to be embedded in the surface of a roller to a certain depth. This requires the hardness of the particles to be greater than the surface hardness of the roller. The electrode material embedded in the surface of the roller is likely to be stuck to the surface of the roller after rolling, which not only leads to the waste of the electrode material but also easily affects the product yield of the generated electrode plate.

SUMMARY

This application is intended to resolve at least one of the technical problems in the prior art. Therefore, a purpose of this application is to propose an apparatus, process, and roller for forming electrode plate to resolve the problem of an electrode material being easily embedded in surface of a roller during formation of an electrode film, resulting in the waste of slurry and affecting the product yield.

To achieve the above purpose, an embodiment of a first aspect of this application provides an apparatus for forming electrode plate. The apparatus includes a first roller and a second roller. An inner cavity of a cylinder of the first roller is provided with a gas outlet structure, the gas outlet structure is connected to a gas supply apparatus, surface of the cylinder of the first roller is provided with a circumferentially distributed cylinder gas discharge structure, and the gas outlet structure is in fluid communication with the cylinder gas discharge structure; and the second roller is disposed opposite the first roller, and a gap is provided between the first roller and the second roller for rolling an electrode material into an electrode film.

In the above embodiment, the inner cavity of the cylinder of the first roller is provided with the gas outlet structure, the gas outlet structure is connected to the gas supply apparatus, and the surface of the cylinder of the first roller is provided with the circumferentially distributed cylinder gas discharge structure. During use, after the electrode material enters the gap between the first roller and the second roller, in the rolling process of the electrode material by the first roller and the second roller, the gas outlet structure in the inner cavity of the cylinder of the first roller discharges gas outward through the circumferentially distributed cylinder gas discharge structure on the surface of the cylinder of the first roller, thereby applying an outward pushing force relative to the surface of the cylinder of the first roller to the electrode material, preventing electrode material particles from remaining embedded in the surface of the cylinder of the first roller after film formation, and improving the product yield.

In some embodiments, the gas outlet structure is a dispersed gas outlet structure. Gas supplied by the gas supply apparatus passes through the dispersed gas outlet structure first and then is discharged from the surface of the cylinder of the first roller through the circumferentially distributed cylinder gas discharge structure. Since the gas outlet structure is a dispersed gas outlet structure, the gas can be uniformly discharged from the surface of the cylinder of the first roller through the circumferentially distributed cylinder gas discharge structure without causing a situation where the discharged gas generates a greater pushing force in some regions and a smaller pushing force in other regions on the surface of the cylinder of the first roller. This helps to ensure a uniform thickness of the generated electrode film at all positions, effectively improving the product yield.

In some embodiments, the dispersed gas outlet structure includes a first roller shaft with a hollow structure, the first roller shaft being inserted through the inner cavity of the cylinder of the first roller. Surface of the first roller shaft is provided with a circumferentially distributed roller shaft gas discharge structure, an inner cavity of the first roller shaft is provided with a gas supply port, and the gas supply port is connected to the gas supply apparatus. In this way, in the process of driving the roller shaft to rotate, the gas supply apparatus supplies gas to the gas supply port in the inner cavity of the first roller shaft, and the gas sequentially passes through the circumferentially distributed roller shaft gas discharge structure on the surface of the first roller shaft and then through the circumferentially distributed cylinder gas discharge structure on the surface of the cylinder of the first roller, to be discharged from the surface of the cylinder of the first roller. Due to the circumferential distribution of the roller shaft gas discharge structure on the surface of the roller shaft and the cylinder gas discharge structure on the surface of the cylinder, the gas can be uniformly discharged from both the surface of the roller shaft and the surface of the cylinder. Therefore, the pushing force applied to the electrode material by the gas discharged from the surface of the cylinder during the rotation of the cylinder driven by the roller shaft is relatively uniform, ensuring the uniform thickness of the formed electrode film and improving the product yield.

In some embodiments, a total opening area of gas discharge vents on the roller shaft gas discharge structure is greater than a total opening area of gas discharge vents on the cylinder gas discharge structure. Therefore, the gas is discharged faster through the roller shaft gas discharge structure than through the cylinder gas discharge structure. Therefore, pressure in a region between the roller shaft and the cylinder of the first roller is higher than the external standard atmospheric pressure. The gas discharged through the roller shaft gas discharge structure but not yet through the cylinder gas discharge structure can exert pressure on a contact surface between the roller shaft and the cylinder inside the cylinder, making the contact between the roller shaft and the cylinder tighter and improving the airtightness between the roller shaft and the cylinder.

In some embodiments, a ratio of the total opening area of the gas discharge vents on the roller shaft gas discharge structure to the total opening area of the gas discharge vents on the cylinder gas discharge structure is greater than or equal to 1.05 and less than or equal to 1.5. In this way, while ensuring that a gas outlet speed of the roller shaft gas discharge structure is greater than a gas outlet speed of the cylinder gas discharge structure, the pressure difference between the inside of the cylinder (a region between an outer surface of the roller shaft and an inner surface of the cylinder) and the external environment can be kept within a predetermined range.

In some embodiments, the cylinder of the first roller and the first roller shaft are hermetically sealed with an elastic sealing element. The elastic sealing element can be provided in a connecting region between the cylinder of the first roller and the first roller shaft. When the pressure inside the cylinder is greater than the external atmospheric pressure, the elastic sealing element expands due to the force, which makes the connection between the cylinder of the first roller and the first roller shaft tighter, effectively improving the airtightness between the internal roller shaft and the external cylinder of the first roller during use.

In some embodiments, the apparatus for forming electrode plate further includes a third roller and a substrate delivery assembly. The third roller is disposed opposite the second roller, and a gap is formed between the second roller and the third roller for rolling the electrode film and a substrate into a laminated electrode plate. The substrate delivery assembly is configured to deliver the substrate into the gap between the second roller and the third roller. In this way, when the first roller and the second roller roll the electrode material into the electrode film, the substrate delivery assembly simultaneously delivers the substrate into the gap between the second roller and the third roller, and the electrode film adheres to surface of the substrate in the rolling process, thus obtaining the desired electrode plate.

In some embodiments, the first roller and the second roller are horizontally arranged side by side, and the third roller and the second roller are horizontally arranged side by side or vertically arranged. Under a condition that the third roller and the second roller are horizontally arranged side by side, the electrode material is first rolled into the electrode film through the gap between the first roller and the second roller, and then the electrode film is moved through the driving action of the second roller into the gap between the second roller and the third roller. In this process, the substrate delivery assembly simultaneously delivers the substrate into the gap between the second roller and the third roller, so that the generated electrode film adheres to the surface of the substrate, thus obtaining a laminated electrode plate, which is output by the driving action of the third roller. When the third roller and the second roller are vertically arranged, a method for obtaining the laminated electrode plate from the electrode material and the substrate is similar to that when the third roller and the second roller are horizontally arranged side by side. The difference is that when the third roller and the second roller are vertically arranged as compared with the side-by-side arrangement of the two rollers, the electrode film obtained by rolling the gap between the first roller and the second roller can be more accurately transferred into the gap between the third roller and the second roller under the action of gravity, thereby effectively improving the yield of the obtained electrode plate.

In some embodiments, the apparatus for forming electrode plate further includes two roller sets and a substrate delivery assembly. Each roller set includes one first roller and one second roller, the two roller sets are arranged in mirror symmetry, the two second rollers in the two roller sets are arranged opposite each other in the center, and a gap is formed between the two second rollers for rolling the electrode film simultaneously on both sides of the substrate into a laminated electrode plate; and the substrate delivery assembly is configured to deliver the substrate into the gap between the two second rollers. In this way, the substrate required for generating the electrode plate is delivered from the gap between the second rollers of the adjacent two roller sets. An electrode material transferred into a gap between the first roller and the second roller of one of the roller sets is first rolled into an electrode film through the gap between them, and then the electrode film is transferred by the driving action of the second roller of the roller set into the gap between the second roller and a third roller and then attached to one side of the substrate. An electrode material transferred into a gap between the first roller and the second roller of the other roller set is also first rolled into an electrode film through the gap between them, and then the electrode film is transferred by the driving action of the second roller of the roller set into a gap between the second roller and a third roller and then attached to the other side of the substrate. By using the above solution, the electrode plate with the electrode film attached to both sides can be obtained, thus meeting different production requirements.

In some embodiments, the two first rollers and the two second rollers in the two roller sets are horizontally arranged side by side. This can effectively improve the space utilization on the one hand, and on the other hand, the electrode film obtained by rolling through the gap between the first roller and the second roller in the roller set can be better transferred to one side of the substrate to be further laminated with the substrate into the electrode plate.

In some embodiments, the apparatus for forming electrode plate further includes a feeding assembly. The feeding assembly is configured to supply the electrode material into the gap between the first roller and the second roller. With the feeding assembly provided, the delivery of the electrode material into the gap between the first roller and the second roller can be ensured to be uninterrupted during the production of the electrode film. This avoids the situation where the surface of the resulting electrode plate has some regions without electrode film due to insufficient electrode material, thus improving the product yield.

An embodiment of a second aspect of this application provides a roller for forming electrode plate. The roller for forming electrode plate is the first roller according to the above embodiments.

An embodiment of a third aspect of this application further provides a process for forming electrode plate including the following steps: feeding an electrode material into a gap between a first roller and a second roller, where the first roller discharges gas outward through a cylinder gas discharge structure circumferentially provided on surface of a cylinder of the first roller; and rotating the first roller and the second roller in opposite directions to roll the electrode material in the gap between the two into an electrode film.

According to the above solution, the cylinder gas discharge structure is provided on the surface of the cylinder of the first roller, and after the electrode material is fed into the gap between the first roller and the second roller, the cylinder gas discharge structure discharges gas outward, applying an outward pushing force to the electrode material, so that electrode material particles do not adhere to the surface of the first roller in the rolling process. This effectively prevents the waste of the electrode material and ensures that the overall thickness of the resulting electrode film is relatively uniform, improving the product yield.

In some embodiments, the first roller discharging gas outward through a cylinder gas discharge structure circumferentially provided on surface of the cylinder of the first roller includes: dispersing gas to an inner cavity of a cylinder of the first roller; and discharging outward the gas supplied to the inner cavity of the cylinder of the first roller through the cylinder gas discharge structure provided on the surface of the cylinder of the first roller. In this way, the gas can be ensured to be uniformly discharged from the cylinder gas discharge structure circumferentially provided on the surface of the cylinder of the first roller, so that the electrode material is uniformly stressed at each position in the process of rolling the electrode material into the electrode film, thereby improving the product yield.

In some embodiments, the dispersing gas into an inner cavity of a cylinder of the first roller includes: supplying gas to an inner cavity of a first roller shaft inserted through the inner cavity of the cylinder of the first roller; and dispersing gas to the inner cavity of the cylinder of the first roller through a roller shaft gas discharge structure provided on surface of the first roller shaft. In this way, when the roller shaft drives the cylinder to rotate, the roller shaft gas discharge structure on the surface of the roller shaft disperses gas into the inner cavity of the cylinder of the first roller, and then the gas is discharged outward through the cylinder gas discharge structure circumferentially provided on the surface of the cylinder. Due to the use of dispersed gas supply by the roller shaft gas discharge structure, and the circumferential distribution of the roller shaft gas discharge structure on the surface of the cylinder, gas is uniformly discharged from all positions on the cylinder in the rotation process. This ensures that the electrode material is uniformly stressed at each position in a process of rolling the electrode material into the electrode film, thereby improving the product yield.

In some embodiments, the process for forming electrode plate further includes: after the electrode material is rolled into the electrode film, peeling off the electrode film from the surface of the cylinder of the first roller and attaching the electrode film to surface of a cylinder of the second roller. The electrode film attached to the surface of the cylinder of the second roller can be laminated with a corresponding substrate through the driving action of the second roller to obtain an electrode plate, improving the production efficiency of products.

In some embodiments, after the electrode material is rolled into the electrode film, the process for forming electrode plate further includes steps: rotating the second roller to feed the electrode film attached to the surface of the cylinder of the second roller, together with a substrate, into a gap between the second roller and a third roller; and rotating the second roller and the third roller in opposite directions to roll the electrode film and the substrate in the gap between the two into a laminated electrode plate. The third roller is provided, and when the electrode film is being formed through rolling in the gap between the first roller and the second roller, the substrate is simultaneously delivered into the gap between the second roller and the third roller. In this way, when the electrode film is transferred into the gap between the second roller and the third roller, the second roller and the third roller can further roll the electrode film and the substrate into an electrode plate.

In some embodiments, two roller sets are used to roll the electrode material into the electrode film. The roller set includes one first roller and one second roller, the two roller sets are arranged in mirror symmetry, and the two second rollers in the two roller sets are disposed opposite each other. After the electrode material is rolled into the electrode film, the following steps are further included: rotating the second rollers to feed the electrode films attached to the surfaces of the cylinders of the two second rollers, together with the provided substrate, into the gap between the two second rollers; and rolling, by the two second rollers rotating in opposite directions, the electrode films and the substrate in the gap between the two second rollers into the laminated electrode plate. This solution allows for obtaining the electrode plate with the electrode film on both sides.

In some embodiments, the process for forming electrode plate further includes the steps: feeding the substrate into the gap between the first roller and the second roller while feeding the electrode material into the gap between the first roller and the second roller, the substrate being located between the electrode material and a cylinder of the second roller; and rolling, by the first roller and the second roller rotating in opposite directions, the electrode material in the gap between the first roller and the second roller into an electrode film, and rolling the electrode film and the substrate into a laminated electrode plate. In this way, in the process of rolling the electrode material into the electrode film by the first roller and the second roller, the substrate is simultaneously transferred into the gap between the first roller and the second roller. Therefore, when rolling the electrode material in the gap between the first roller and the second roller into the electrode film, the first roller and the second roller simultaneously roll the electrode film and the substrate together into a laminated electrode plate. This allows for obtaining the desired electrode plate through lamination using only the first roller and the second roller.

In some embodiments, the electrode material has a volumetric water content ≤20%. At present, to prevent the problem of the electrode material being easily embedded in the surface of the first roller in the rolling process, the volumetric water content of the electrode material is usually required to be greater than 20%. This leads to a limited percentage of solid components of the electrode material and affects the quality of the electrode film formed by rolling. The cylinder gas discharge structure on the surface of the cylinder of the first roller designed in this application effectively overcomes the problem of the electrode material being easily embedded in the surface of the cylinder in the rolling process. Therefore, in actual film formation, the volumetric water content of the electrode material can be set to less than or equal to 20%, thus effectively ensuring the quality of the formed electrode film.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

In the accompanying drawings, unless otherwise specified, like reference signs throughout a plurality of the accompanying drawings denote like or similar components or elements. The accompanying drawings are not necessarily drawn to scale. It should be understood that these accompanying drawings merely describe some embodiments disclosed in this application, and should not be construed as a limitation on the scope of this application.

FIG. 10 is a schematic structural diagram of an apparatus for forming electrode plate according to some other embodiments of this application;

FIG. 11 is a flowchart of a process for forming electrode plate according to some embodiments of this application;

Figure 1:
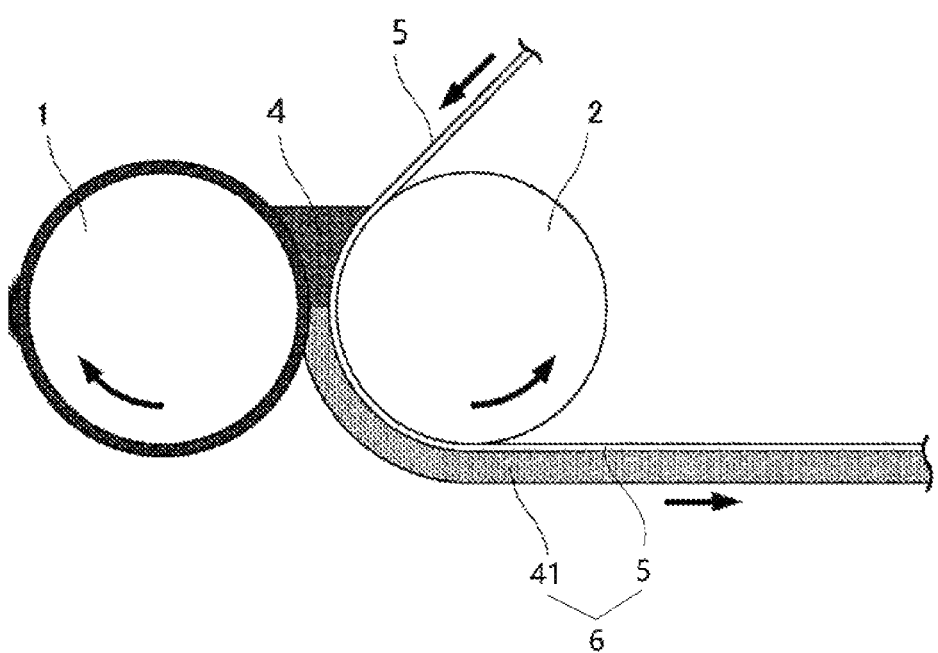
FIG. 1 is a schematic structural diagram of an apparatus for forming electrode plate according to some embodiments of this application.

DESCRIPTION OF REFERENCE SIGNS 1. first roller; 11. cylinder of first roller; 111. gas outlet structure; 112. cylinder gas discharge structure; 12. first roller shaft; 121. roller shaft gas discharge structure; 122. gas supply port; 13. bearing; 14. bearing sealing disk; 2. second roller; 3. third roller; 4. electrode material; 41. electrode film; 5. substrate; 6. electrode plate; 7. feeding assembly; and 8. roller set.

DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the description of the embodiments of this application, the terms "first", "second" and the like are merely intended to distinguish between different objects, and shall not be understood as any indication or implication of relative importance or any implicit indication of the number, sequence or primary-secondary relationship of the technical features indicated. In the description of this application, "a plurality of" means at least two unless otherwise specifically stated.

In this specification, reference to "embodiment" means that specific features, structures, or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal" "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of the description of the embodiments of this application rather than indicating or implying that the apparatuses or components mentioned must have specific orientations, or must be constructed or manipulated according to specific orientations, and therefore shall not be construed as any limitations on embodiments of this application.

In the description of the embodiments of this application, unless otherwise specified and defined explicitly, the technical terms "mount", "connect", "join", and "fasten" should be understood in their general senses. For example, they may refer to a fixed connection, a detachable connection, or an integrated connection, may refer to a mechanical connection or an electrical connection, and may refer to a direct connection, an indirect connection through an intermediate medium, an internal communication between two elements, or an interaction between two elements. Persons of ordinary skill in the art can understand specific meanings of these terms in this application as appropriate to specific situations.

At present, for preparation of electrode plate, in addition to rolling a substrate, an electrode material also needs to be rolled into an electrode film and then laminated with the substrate to obtain a desired electrode plate. The electrode material is usually in a form of particles and is easily embedded in surface of the roller in the rolling process, causing not only the waste of raw materials but also inconsistency in the thickness of the electrode film obtained by rolling, which affects the product yield.

To resolve the problem of coating particles being easily embedded in the surface of the roller during film formation by rolling, an apparatus for manufacturing coating film is proposed, including: one or two first rollers for rolling a mixture coating; and a second roller disposed opposite the first roller. The mixture coating is sandwiched between the first roller and the second roller, and at least one of the first rollers has a surface layer with lower hardness than the coating particles on the surface. The mixture coating is supplied into a gap between the two first rollers or a gap between the first roller and the second roller, and the mixture coating is rolled to manufacture a coating film. In the above solution, a surface layer with optimized hardness is provided on the surface of the roller configured to supply a mixture coating. This allows for maintaining high productivity and producing a high-quality coating film with a uniform film thickness even when a moist coating that does not require a coating drying process is used.

However, the inventors have noted that the apparatus for manufacturing coating film has at least the following disadvantages: (1) At least one of the first rollers needs to have a surface layer with lower hardness than the coating particles on the surface, which requires increasing the particle hardness of an electrode material 4 or requires the first roller to be a soft roller, limiting the scenario in which the electrode film 41 is processed. (2) When the electrode material 4 is rolled into a film, typically the particles of the electrode material 4 need to be embedded in the surface of the first roller to a depth of 5%-50% of their own particle size, and therefore the particles are easy to remain on the surface of the first roller after film formation by rolling, resulting in the waste of the electrode material 4. (3) The electrode material 4 needs to satisfy a predetermined value. To ensure that the hard electrode material 4 can eventually form the electrode film 41, a volumetric water content of the electrode material 4 needs to be greater than 20%. Therefore, an electrode material 4 with a lower volumetric water content is not applicable to the apparatus for manufacturing coating film in the above solution.

To resolve the technical problems that the current apparatus for manufacturing coating film imposes some requirements on the hardness of the coating particles and that coating particles are easily to adhere to a coating roller during film formation by rolling, as shown in FIG. 1, some embodiments of a first aspect of this application provide an apparatus for forming electrode plate. The apparatus for forming electrode plate includes a first roller 1 and a second roller 2, where an inner cavity of a cylinder 11 of the first roller is provided with a gas outlet structure 111, and the gas outlet structure 111 is connected to a gas supply apparatus. Surface of the cylinder 11 of the first roller 1 is provided with a circumferentially distributed cylinder gas discharge structure 112, and the gas outlet structure 111 is in fluid communication with the cylinder gas discharge structure 112. The second roller 2 is disposed opposite the first roller 1, and a gap is provided between the first roller 1 and the second roller 2 to roll the electrode material 4 into the electrode film 41.

The gas outlet structure 111 may be directly connected to the gas supply apparatus or may be connected to the gas supply apparatus through a gas supply pipeline. The gas outlet structure 111 may be a gas outlet hole provided in the inner cavity of the cylinder or a gas outlet hole provided in a side wall of the cylinder. Under a condition that the gas outlet structure 111 is a gas outlet hole provided in the side wall of the cylinder, the gas supplied by the gas supply apparatus enters the inner cavity of the cylinder through the gas outlet hole in the side wall of the cylinder, and then is discharged through the cylinder gas discharge structure 112 on the surface of the cylinder. The gas supply apparatus may be a gas tank with gas stored or a gas pump. The gas pump extracts and delivers outside air to the gas outlet structure 111 to achieve the function of supplying gas to the inner cavity of the cylinder.

The cylinder gas discharge structure 112 may be a circumferentially distributed gas discharge vent array on the surface of the cylinder 11 of the first roller, or a gas discharge gap circumferentially distributed on the surface of the cylinder 11 of the first roller. A difference between the gas discharge gap and the gas discharge vent array is that multiple gas discharge vents in the same gas discharge vent array are spaced apart, while the gas discharge gap is continuous. In some embodiments, adjacent gas discharge vent arrays or gas discharge gaps are arranged in parallel with equal spacing, which allows the gas discharged from the cylinder gas discharge structure 112 to be more uniform in the rolling process of the first roller 1.

According to the apparatus for forming electrode plate in this application, the inner cavity of the cylinder 11 of the first roller is provided with the gas outlet structure 111, the gas outlet structure 111 is connected to the gas supply apparatus, and the surface of the cylinder 11 of the first roller is provided with a circumferentially distributed cylinder gas discharge structure 112. During use, after the electrode material 4 enters the gap between the first roller 1 and the second roller 2, the gas outlet structure 111 of the inner cavity of the cylinder 11 of the first roller discharges gas through the circumferentially distributed cylinder gas discharge structure 112 on the surface of the cylinder 11 of the first roller in the rolling process of the electrode material 4 by the first roller 1 and the second roller 2, applying an outward pushing force to the electrode material 4 relative to the surface of the cylinder 11 of the first roller, so that particles of the electrode material 4 do not adhere to the surface of the cylinder 11 of the first roller, improving the product yield.

As shown in FIG. 1, when the first roller 1 and the second roller 2 roll the electrode material 4 into the electrode film 41, a substrate 5 can be delivered simultaneously into the gap between the first roller 1 and the second roller 2 such that the substrate 5 and the electrode film 41 are rolled by the first roller 1 and the second roller 2 into a laminated electrode plate 6 A material of the substrate 5 may be, for example, a metal material with good ductility.

In some embodiments, the gas outlet structure 111 is a dispersed gas outlet structure 111.

Gas supplied by the gas supply apparatus passes through the dispersed first gas outlet structure 111 and then is discharged from the surface of the cylinder 11 of the first roller through the circumferentially distributed cylinder gas discharge structure 112. Since the gas outlet structure 111 is the dispersed gas outlet structure 111, the gas can be uniformly discharged from the surface of the cylinder 11 of the first roller through the circumferentially distributed cylinder gas discharge structure 112, without causing a situation where the discharged gas generates a greater pushing force in some regions and a smaller pushing force in other regions on the surface of the cylinder 11 of the first roller. This helps to ensure a uniform thickness of the generated electrode film 41 at all positions, effectively improving the product yield.

In some embodiments, as shown in FIGS. 3 to 7, the dispersed gas outlet structure 111 includes a first roller shaft 12. The first roller shaft 12 is a hollow structure and is inserted through the inner cavity of the cylinder 11 of the first roller 1; surface of the first roller shaft 12 is provided with a circumferentially distributed roller shaft gas discharge structure 121, and an inner cavity of the first roller shaft 12 is provided with a gas supply port 122, and the gas supply port 122 is connected to a gas supply apparatus. In this way, in the process of driving the roller shaft to rotate, the gas supply apparatus simultaneously supplies gas to the gas supply port 122 in the inner cavity of the first roller shaft 12, and the gas sequentially passes through the circumferentially distributed roller shaft gas discharge structure 121 on the surface of the first roller shaft 12 and then through the circumferentially distributed cylinder gas discharge structure 112 on the surface of the cylinder 11 of the first roller, to be discharged from the surface of the cylinder 11 of the first roller. Due to the circumferential distribution of the roller shaft gas discharge structure 121 on the surface of the roller shaft and the cylinder gas discharge structure 112 on the surface of the cylinder, the gas can be uniformly discharged from both the surface of the roller shaft and the surface of the cylinder. Therefore, relatively uniform pressure is applied to the electrode material 4 by the gas discharged from the surface of the cylinder during the rotation of the cylinder driven by the roller shaft, ensuring that thickness deviation of the formed electrode film 41 is small, and improving the product yield.

The roller shaft gas discharge structure 121 may be a circumferentially distributed gas discharge vent array on the surface of the cylinder 11 of the first roller, or a circumferentially distributed gas discharge gap on the surface of the first roller shaft 12. A difference between the gas discharge gap and the gas discharge vent array is that multiple gas discharge vents in the same gas discharge vent array are spaced apart, while the gas discharge gap is continuous. In some embodiments, adjacent gas discharge vent arrays or gas discharge gaps may be arranged in parallel with equal spacing, which allows the gas discharged into the inner cavity of the cylinder 11 of the first roller through the roller shaft gas discharge structure 121 to be uniformly discharged in the process of driving the first roller shaft 12 to rotate. Furthermore, the gas in the inner cavity of the cylinder 11 of the first roller is discharged through the cylinder gas discharge structure 112 circumferentially distributed on the surface of the cylinder 11 of the first roller, so that the gas is uniformly discharged from the surface of the cylinder 11 of the first roller. This makes the electrode material 4 is uniformly stressed in the process of rolling the electrode material 4 into the electrode film 41 and ensures that the thickness deviation of the formed electrode film 41 is small, improving the product yield.

Figure 2:
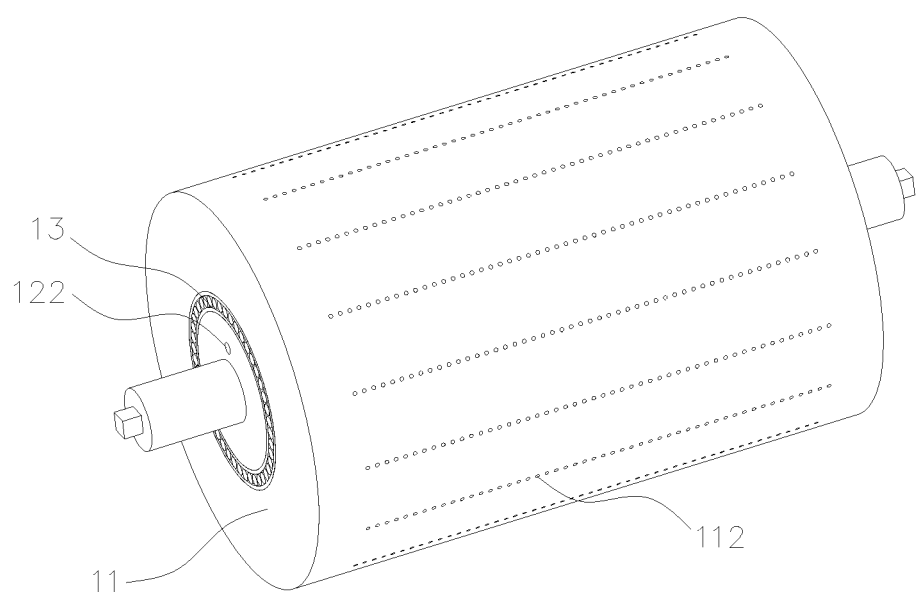
FIG. 2 is a schematic structural diagram of an assembled first roller according to some embodiments of this application.
Figure 3:
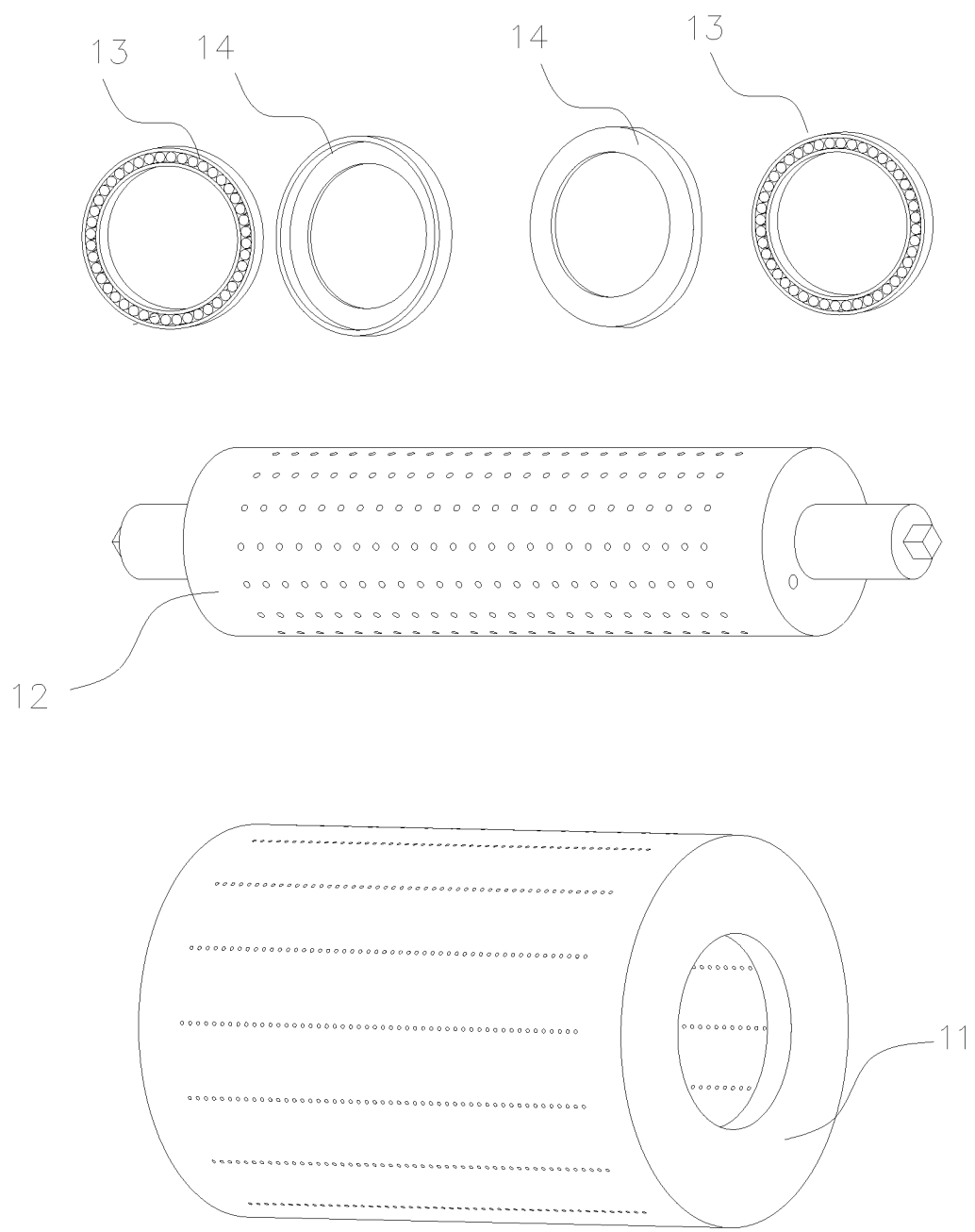
FIG. 3 is a schematic structural diagram of a disassembled first roller according to some embodiments of this application.
Figure 4:
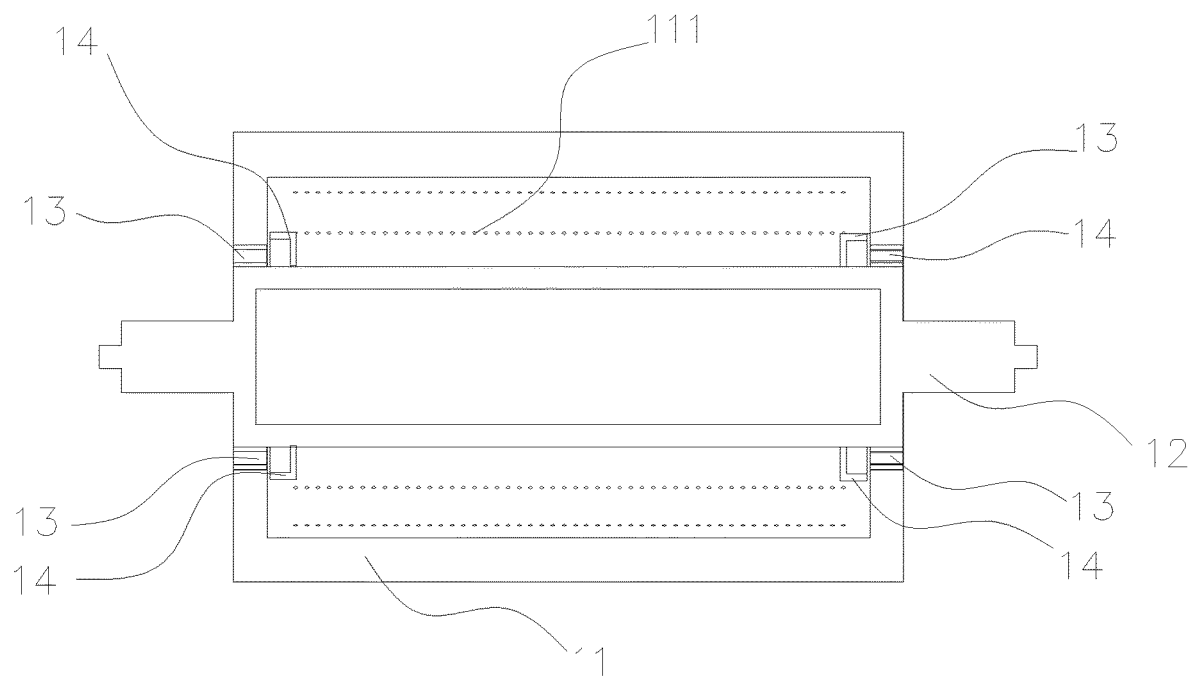
FIG. 4 is a cross-sectional view of a first roller as viewed from the main direction, according to some embodiments of this application.

As shown in FIGS. 2 to 4, the first roller 1 includes the cylinder, a first roller shaft 12, bearing sealing disks 14, and bearings 13. The cylinder 11 of the first roller is sleeved on the first roller shaft 12, and two ends of the cylinder 11 of the first roller are connected to two ends of the first roller shaft 12 respectively via the bearings 13. When the first roller shaft 12 rotates under the action of a driving mechanism, the bearings 13 disposed on the two ends of the first roller shaft 12 simultaneously rotate, thereby driving the cylinder 11 of the first roller. To avoid relative sliding of the bearings 13 inside the cylinder during the rotation, the bearing sealing disk 14 for placing the bearing 13 is also sleeved on each end of the first roller shaft 12.

Figure 5:
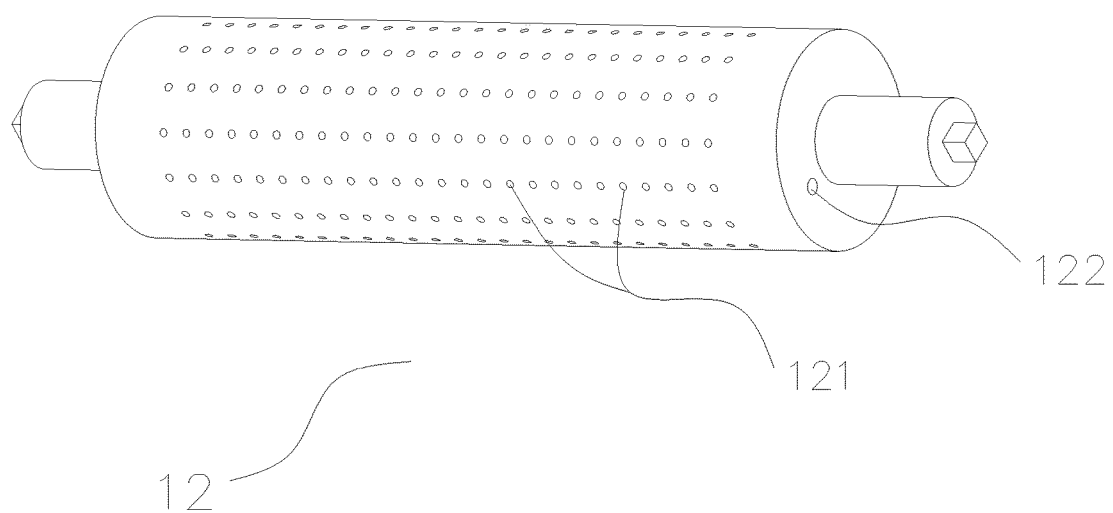
FIG. 5 is a schematic diagram of a first roller shaft according to some embodiments of this application.

FIG. 5 is a schematic diagram of the first roller shaft 12 according to some embodiments of this application. The first roller shaft 12 is provided with a roller shaft gas discharge structure 121 arranged circumferentially on the surface of the roller shaft. For example, the roller shaft gas discharge structure 121 in FIG. 5 is a plurality of gas discharge vent arrays arranged side by side, and each gas discharge vent array includes a plurality of gas discharge vents arranged along an axial direction of the roller shaft. Certainly, in some other embodiments, the gas discharge vent arrays may alternatively be provided on the surface of the roller shaft in the rotating direction of the roller shaft. In some embodiments, adjacent gas discharge vent arrays may be equally spaced in parallel. The roller shaft gas discharge structure 121 may alternatively be a gas discharge gap array, and the gas discharge gap array includes a plurality of gas discharge gaps arranged side by side. The gas discharge gaps may be arranged along the rotating direction of the first roller shaft 12 or may be arranged along the axial direction of the first roller shaft 12, and in some embodiments, adjacent gas discharge gaps may be equally spaced in parallel.

The first roller shaft 12 is further provided with the gas supply port 122 for connecting to the gas supply apparatus to receive the gas provided by the gas supply apparatus. For example, the gas supply port 122 in FIG. 5 is provided in the side wall of the first roller shaft 12, and the gas provided by the gas supply apparatus first enters the hollow inner cavity of the first roller shaft 12 through the gas supply port 122, and then flows through the roller shaft gas discharge structure 121 provided on the surface of the first roller shaft 12, and is then discharged into the inner cavity of the cylinder. In some other embodiments, there may alternatively be multiple gas supply ports 122. For example, one gas supply port 122 may be provided on each of the two sides of the first roller shaft 12, and the gas supply apparatus may simultaneously provide gas to the two gas supply ports 122 during gas supply.

Figure 6:
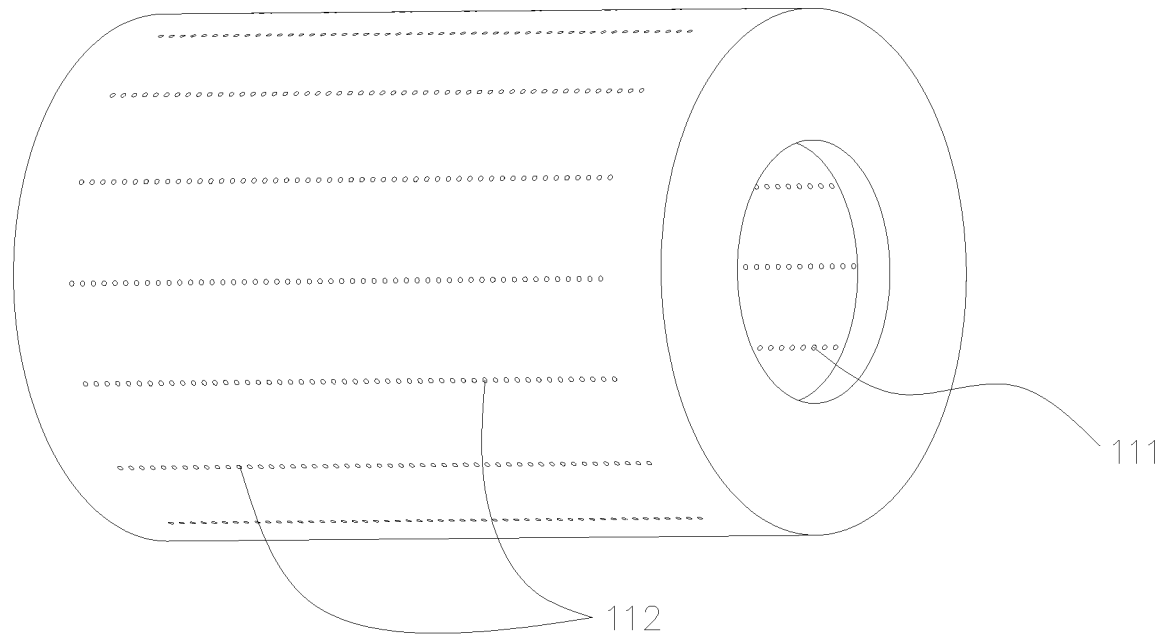
FIG. 6 is a schematic diagram of a cylinder of a first roller according to some embodiments of this application.
Figure 7:
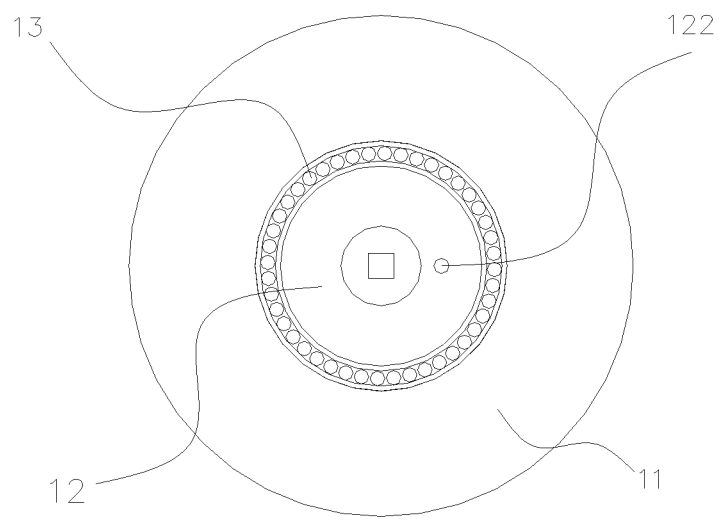
FIG. 7 is a side view of a first roller according to some embodiments of this application.

FIG. 6 is a schematic diagram of the cylinder 11 of the first roller according to some embodiments of this application. The surface of the cylinder 11 of the first roller is provided with the circumferentially arranged cylinder gas discharge structure 112. For example, the cylinder gas discharge structure 112 in FIG. 6 is a plurality of gas discharge vent arrays arranged side by side, and each gas discharge vent array includes a plurality of gas discharge vents arranged along the axial direction of the roller; certainly, in some other embodiments, the gas discharge vent arrays may alternatively be provided on the surface of the cylinder along the rotating direction of the cylinder, and in some embodiments, adjacent gas discharge vent arrays may be equally spaced in parallel. The cylinder gas discharge structure 112 may alternatively be a gas discharge gap array. The gas discharge gap array includes a plurality of gas discharge gaps arranged side by side, and the gas discharge gaps may be arranged along the rotating direction of the first roller shaft or along the axial direction of the first roller. In some embodiments, adjacent discharge gaps may be equally spaced in parallel. FIG. 7 shows a side of the assembled first roller shaft 12.

In some embodiments of this application, a total opening area of the gas discharge vents on the roller shaft gas discharge structure 121 is greater than a total opening area of the gas discharge vents on the cylinder gas discharge structure 112. Therefore, the gas is discharged faster through the roller shaft gas discharge structure 121 than through the cylinder gas discharge structure 112. Therefore, pressure in a region between the roller shaft and the cylinder of the first roller is higher than the external standard atmospheric pressure. The gas discharged through the roller shaft gas discharge structure 121 but not yet through the cylinder gas discharge structure 112 can exert pressure on a contact surface between the roller shaft and the cylinder inside the cylinder, making the contact between the roller shaft and the cylinder tighter and improving the airtightness between the roller shaft and the cylinder.

In some embodiments of this application, a ratio of the total opening area of the gas discharge vents on the roller shaft gas discharge structure 121 to the total opening area of the gas discharge vents on the cylinder gas discharge structure 112 is greater than or equal to 1.05 and less than or equal to 1.5. In this way, while ensuring that a gas outlet speed of the roller shaft gas discharge structure 121 is greater than a gas outlet speed of the cylinder gas discharge structure 112, the pressure difference between the inside of the cylinder (a region between an outer surface of the roller shaft and an inner surface of the cylinder) and the external environment can be kept within a predetermined range.

In some embodiments, the cylinder 11 of the first roller and the first roller shaft 12 are hermetically sealed with an elastic sealing element. The elastic sealing element can be provided in a connecting region between the cylinder 11 of the first roller and the first roller shaft 12. When the pressure inside the cylinder is greater than the external atmospheric pressure, the elastic sealing element expands due to the force, which makes the connection between the cylinder 11 of the first roller and the first roller shaft 12 tighter, effectively improving the airtightness between the internal roller shaft and the external cylinder of the first roller 1 during use. The elastic sealing element may be a rubber ring, a silicone ring, or the like.

Figure 8:
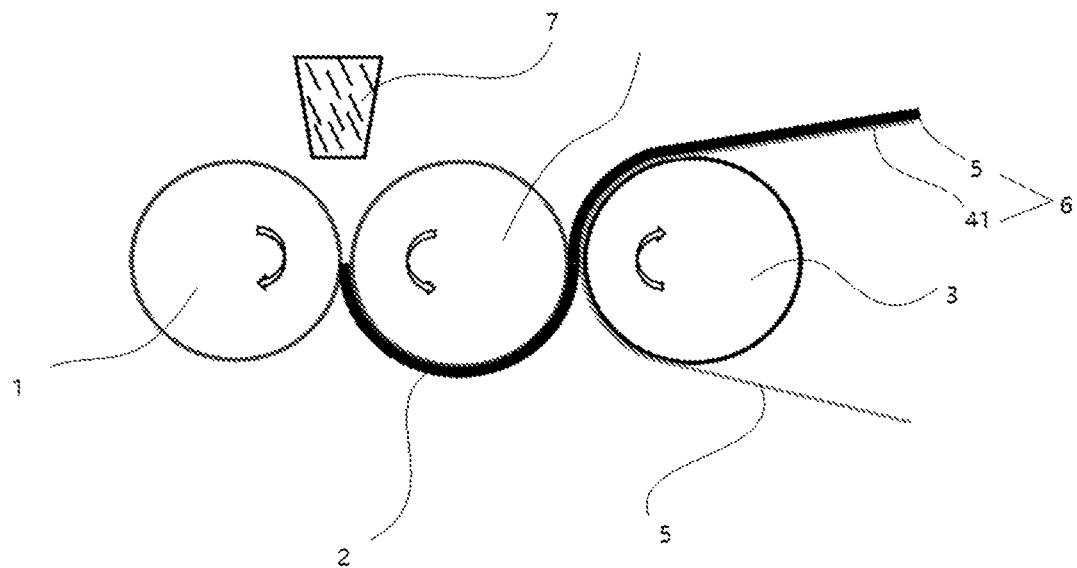
FIG. 8 is a schematic structural diagram of an apparatus for forming electrode plate according to some other embodiments of this application.
Figure 9:
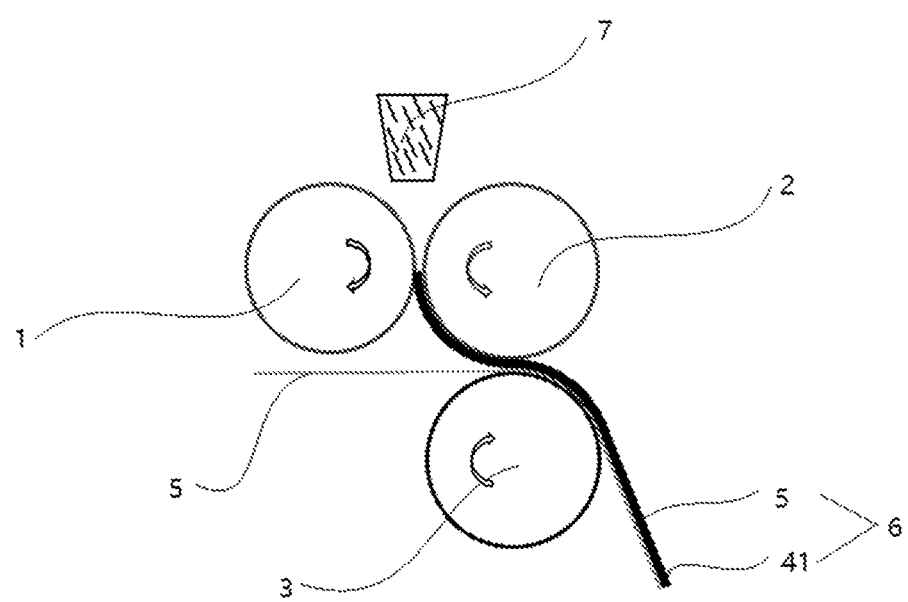
FIG. 9 is a schematic structural diagram of an apparatus for forming electrode plate according to some other embodiments of this application.

As shown in FIGS. 8 and 9, in some embodiments of this application, the apparatus for forming electrode plate further includes a third roller 3 and a substrate delivery assembly. The third roller 3 is disposed opposite the second roller 2, and a gap is formed between the second roller 2 and the third roller 3 for rolling the electrode film 41 and the substrate 5 into a laminated electrode plate 6. The substrate delivery assembly is configured to deliver the substrate 5 into the gap between the second roller 2 and the third roller 3. In this way, when the first roller 1 and second roller 2 roll the electrode material 4 into the electrode film 41, the substrate delivery assembly simultaneously delivers the substrate 5 into the gap between the second roller 2 and third roller 3, and the electrode film 41 adheres to surface of the substrate 5 in the rolling process, thus obtaining the desired electrode plate 6.

As shown in FIGS. 8 and 9, in some embodiments of this application, the first roller 1 and the second roller 2 are horizontally arranged side by side, and the third roller 3 and the second roller 2 are horizontally arranged side by side or vertically arranged. The third roller 3 and the second roller 2 may be vertically arranged in a perpendicular orientation or at a tilted angle.

As shown in FIG. 8, under a condition that the third roller 3 and the second roller 2 are horizontally arranged side by side, the electrode material is first rolled into the electrode film 41 through the gap between the first roller 1 and the second roller 2, and then the electrode film 41 is moved through the driving action of the second roller 2 into the gap between the second roller 2 and the third roller 3. In this process, the substrate delivery assembly simultaneously delivers the substrate 5 into the gap between the second roller 2 and the third roller 3, so that the generated electrode film 41 adheres to the surface of the substrate 5 to obtain a laminated electrode plate 6, and the laminated electrode plate 6 is output by the driving action of the third roller 3.

As shown in FIG. 9, when the third roller 3 and the second roller 2 are vertically arranged, a method for obtaining the laminated electrode plate 6 from the electrode material 4 and the substrate 5 is similar to that when the third roller 3 and the second roller 2 are horizontally arranged. The difference is that when the third roller 3 and the second roller 2 are vertically arranged as compared with the side-by-side arrangement of the two, the electrode film 41 obtained by rolling the gap between the first roller 1 and the second roller 2 can be more accurately transferred into the gap between the third roller 3 and the second roller 2 under the action of gravity, thereby effectively improving the yield of the obtained electrode plate 6.

As shown in FIG. 10, in some embodiments of this application, the apparatus for forming electrode plate further includes two roller sets 8 and a substrate 5 delivery assembly. Each roller set 8 includes one first roller 1 and one second roller 2, the two roller sets 8 are arranged in mirror symmetry, the two second rollers 2 in the two roller sets 8 are arranged opposite each other in the center, and a gap is formed between the two second rollers 2 for rolling the electrode film 41 simultaneously on both sides of the substrate 5 into a laminated electrode plate 6; and the substrate 5 delivery assembly is configured to deliver the substrate 5 into the gap between the two second rollers 2. In this way, the substrate 5 required for generating the electrode plate 6 is delivered from the gap between the second rollers 2 of the adjacent two roller sets 8. An electrode material 4 transferred into a gap between the first roller 1 and the second roller 2 of one of the roller sets 8 is first rolled into an electrode film 41 through the gap between them, and then the electrode film 41 is transferred by the driving action of the second roller 2 of the roller set 8 into the gap between the second roller 2 and a third roller 3 and then attached to one side of the substrate 5. An electrode material 4 transferred into a gap between the first roller 1 and the second roller 2 of the other roller set 8 is also first rolled into an electrode film 41 through the gap between them, and then the electrode film 41 is transferred by the driving action of the second roller 2 of the roller set 8 into a gap between the second roller 2 and a third roller 3 and then attached to the other side of the substrate 5. By using the above solution, the electrode plate 6 with the electrode film 41 attached to both sides can be obtained, thus meeting different production requirements.

As shown in FIG. 10, in some embodiments of this application, the two first rollers 1 and the two second rollers 2 in the two roller sets 8 are horizontally arranged side by side. This can effectively improve the space utilization on the one hand, and on the other hand, the electrode film 41 obtained by rolling through the gap between the first roller 1 and the second roller 2 in the roller set 8 can be better transferred to one side of the substrate 5 to be further laminated with the substrate 5 into the electrode plate 6.

As shown in FIGS. 8 and 9, in some embodiments of this application, the apparatus for forming electrode plate further includes a feeding assembly 7. The feeding assembly 7 is configured to supply the electrode material 4 into the gap between the first roller 1 and the second roller 2. With the feeding assembly 7 provided, the delivery of the electrode material 4 into the gap between the first roller 1 and the second roller 2 can be ensured to be uninterrupted during the production of the electrode film 41. This avoids the situation where the surface of the resulting electrode plate 6 has some regions without electrode film 41 due to insufficient electrode material 4, thus improving the product yield.

An embodiment of a second aspect of this application provides a roller for forming electrode plate. The roller for forming electrode plate is the first roller 1 according to the above embodiments. A structure of the first roller 1 is as described above with respect to FIGS. 2 to 7, and is not be described herein again.

An embodiment of the third aspect of this application further provides a process for forming electrode plate, as shown in FIG. 11. The process for forming electrode plate includes the following steps.

Step S111: Feed an electrode material 4 into a gap between a first roller 1 and a second roller 2, where the first roller 1 discharges gas outward through a cylinder gas discharge structure 112 circumferentially provided on surface of a cylinder of the first roller 1.

Step S112: Rotate the first roller 1 and the second roller 2 in opposite directions to roll the electrode material 4 in the gap between the two into an electrode film 41.

According to this embodiment, the cylinder gas discharge structure 112 is provided on the surface of the cylinder 11 of the first roller, and after the electrode material 4 is fed into the gap between the first roller 1 and the second roller 2, the cylinder gas discharge structure 112 discharges gas outward, applying an outward pushing force to the electrode material 4, so that electrode material 4 particles do not adhere to the surface of the first roller 1 in the rolling process. This effectively prevents the waste of the electrode material 4 and ensures that the overall thickness of the resulting electrode film 41 is relatively uniform, improving the product yield.

Figure 12:
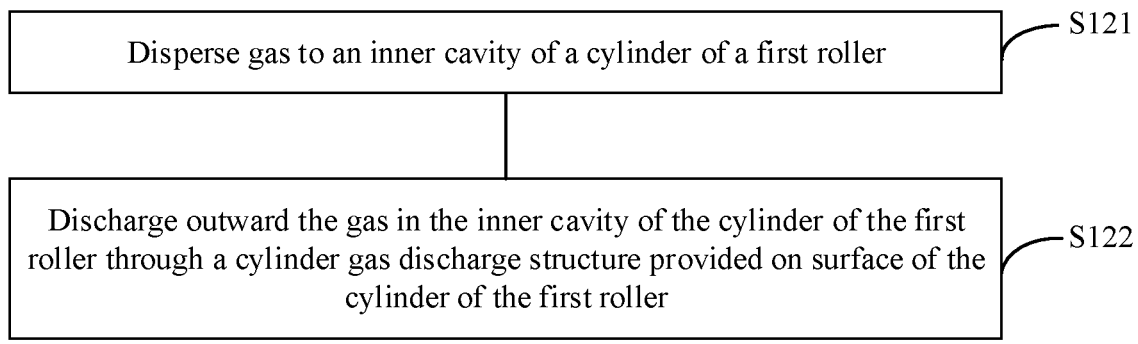
FIG. 12 is a flowchart of a process for forming electrode plate according to some other embodiments of this application.

In some embodiments, as shown in FIG. 12, the first roller 1 discharging gas outwardly through a cylinder gas discharge structure 112 circumferentially provided on the surface of the cylinder of the first roller 1 includes the following steps.

Step S121: Disperse gas to an inner cavity of a cylinder 11 of the first roller.

Step S122: Discharge outward the gas supplied to the inner cavity of the cylinder 11 of the first roller through the cylinder gas discharge structure 112 provided on the surface of the cylinder 11 of the first roller.

This embodiment can ensure that the gas can be simultaneously uniformly discharged from the cylinder gas discharge structure 112 circumferentially provided on the surface of the cylinder 11 of the first roller, so that the electrode material 4 is uniformly stressed at each position in the process of rolling the electrode material 4 into the electrode film 41, thereby improving the product yield.

In some embodiments, the dispersing gas into an inner cavity of a cylinder 11 of the first roller includes: supplying gas to an inner cavity of a first roller shaft 12 inserted through the inner cavity of the cylinder of the first roller 1; and dispersing gas to the inner cavity of the cylinder of the first roller 1 through a roller shaft gas discharge structure 121 provided on surface of the first roller shaft 12. In this embodiment, when the roller shaft drives the cylinder to rotate, the roller shaft gas discharge structure 121 on the surface of the roller shaft disperses gas into the inner cavity of the cylinder of the first roller, and then the gas is discharged outward through the cylinder gas discharge structure 112 circumferentially provided on the surface of the cylinder. Due to the use of dispersed gas supply by the roller shaft gas discharge structure 121, and the circumferential distribution of the roller shaft gas discharge structure 121 on the surface of the cylinder, gas is uniformly discharged from all positions on the cylinder in the rotation process. This ensures that the electrode material 4 is uniformly stressed at each position in a process of rolling the electrode material 4 into the electrode film 41, thereby improving the product yield.

In some embodiments, the process for forming electrode plate further includes: after the electrode material 4 is rolled into the electrode film 41, peeling off the electrode film 41 from the surface of the cylinder 11 of the first roller and attaching the electrode film 41 to surface of a cylinder of the second roller 2. The electrode film 41 attached to the surface of the cylinder of the second roller 2 can be laminated with a corresponding substrate 5 through the driving action of the second roller 2 to obtain an electrode plate 6, improving the production efficiency of products.

Figure 13:
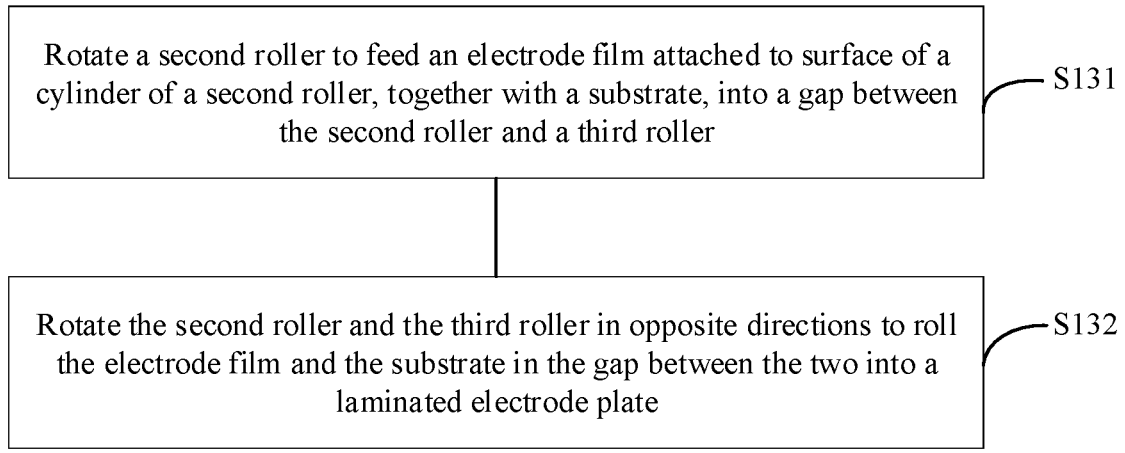
FIG. 13 is a flowchart of a process for forming electrode plate according to some other embodiments of this application.

In some embodiments, as shown in FIG. 13, after the electrode material 4 is rolled into the electrode film 41, the process for forming electrode plate further includes the following steps.

Step S131: Rotate the second roller 2 to feed the electrode film 41 attached to the surface of the cylinder of the second roller 2, together with a provided substrate 5, into a gap between the second roller 2 and a third roller 3.

Step S132: Rotate the second roller 2 and the third roller 3 in opposite directions to roll the electrode film 41 and the substrate 5 in the gap between the two into a laminated electrode plate 6.

The third roller 3 is provided, and when the electrode film 41 is being formed through rolling in the gap between the first roller 1 and the second roller 2, the substrate 5 is simultaneously delivered into the gap between the second roller 2 and the third roller 3. In this way, when the electrode film 41 is transferred into the gap between the second roller 2 and the third roller 3, the second roller 2 and the third roller 3 can further roll the electrode film 41 and the substrate 5 into an electrode plate 6.

Figure 14:
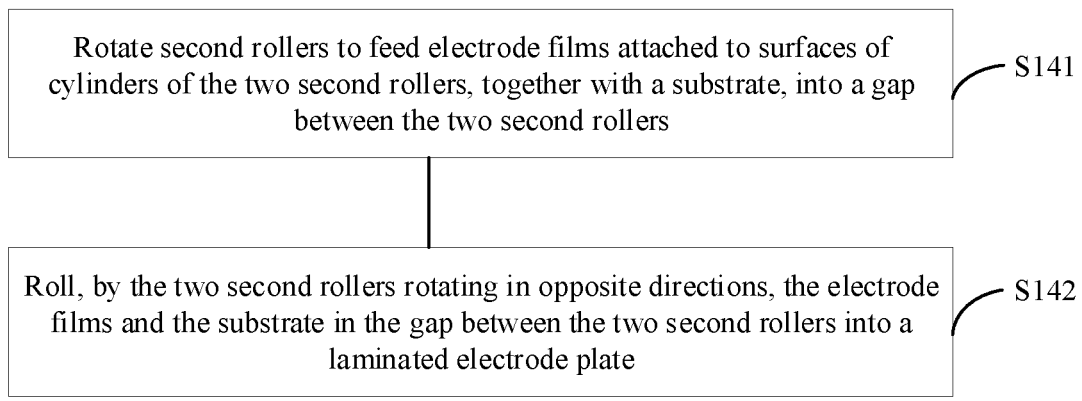
FIG. 14 is a flowchart of a process for forming electrode plate according to some other embodiments of this application.

In some embodiments, two roller sets 8 are used to roll the electrode material 4 into the electrode film 41. The roller set 8 includes one first roller 1 and one second roller 2, the two roller sets 8 are arranged in mirror symmetry, and the two second rollers 2 in the two roller sets 8 are arranged opposite each other. As shown in FIG. 14, after the electrode material 4 is rolled into the electrode film 41, the following steps are further included.

Step S141: Rotate the second rollers 2 to feed the electrode films 41 attached to the surfaces of the cylinders of the two second rollers 2, together with the provided substrate 5, into a gap between the two second rollers 2.

Step S142: Roll, by the two second rollers 2 rotating in opposite directions, the electrode films 41 and the substrate 5 in the gap between the two second rollers 2 into the laminated electrode plate 6.

The technical solution of this embodiment can allow for rolling to obtain the electrode plate 6 with the electrode film 41 on both sides.

Figure 15:
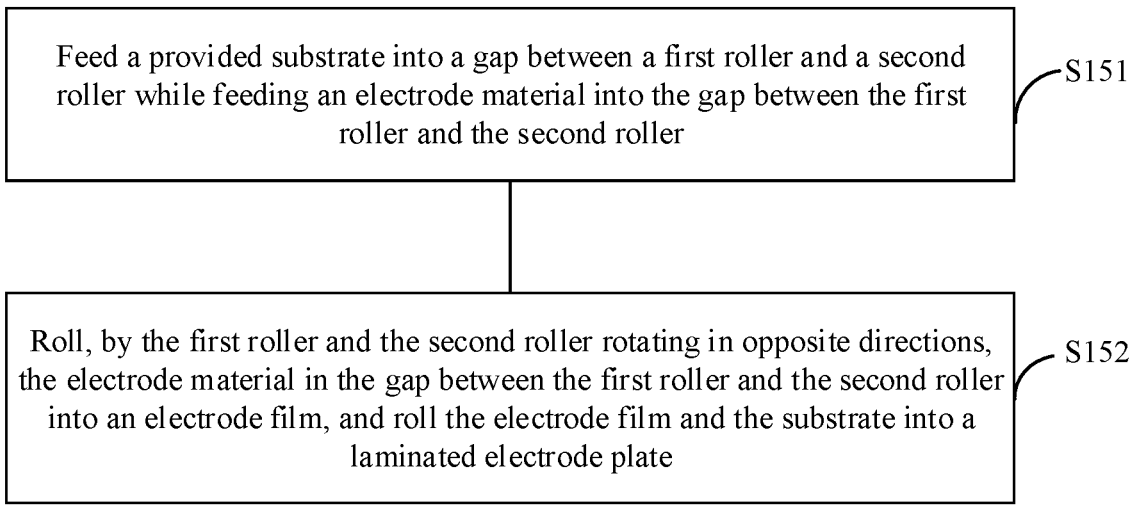
FIG. 15 is a flowchart of a process for forming electrode plate according to some other embodiments of this application.

In some embodiments, as shown in FIG. 15, the process for forming electrode plate further includes the following steps.

Step S151: Feed the provided substrate 5 into the gap between the first roller 1 and the second roller 2 while feeding the electrode material 4 into the gap between the first roller 1 and the second roller 2, the substrate 5 being located between the electrode material 4 and a cylinder of the second roller 2.

Step S152: Roll, by the first roller 1 and the second roller 2 rotating in opposite directions, the electrode material 4 in the gap between the first roller 1 and the second roller 2 into an electrode film 41, and roll the electrode film 41 and the substrate 5 into a laminated electrode plate 6.

In this embodiment, in the process of rolling the electrode material 4 into the electrode film 41 by the first roller 1 and the second roller 2, the substrate 5 is simultaneously transferred into the gap between the first roller 1 and the second roller 2. Therefore, when rolling the electrode material 4 in the gap between the first roller 1 and the second roller 2 into the electrode film 41, the first roller 1 and the second roller 2 simultaneously roll the electrode film 41 and the substrate 5 together into a laminated electrode plate 6. This allows for obtaining the desired electrode plate 6 through lamination using only the first roller 1 and the second roller 2.

In some embodiments, the electrode material 4 has a volumetric water content less than or equal to 20%.

At present, to prevent the problem of the electrode material 4 being easily embedded in the surface of the first roller 1 in the rolling process, the volumetric water content of the electrode material 4 is usually required to be greater than 20%. This leads to a limited percentage of solid components of the electrode material 4 and affects the quality of the electrode film 41 formed by rolling. The cylinder gas discharge structure 112 on the surface of the cylinder 11 of the first roller 1 designed in this application effectively overcomes the problem of the electrode material 4 being easily embedded in the surface of the cylinder in the rolling process. Therefore, in actual film formation, the volumetric water content of the electrode material 4 can be set to less than or equal to 20%, thus effectively ensuring the quality of the formed electrode film 41.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

The invention claimed is:

1. An apparatus for forming an electrode plate, comprising:
   a first roller and a second roller disposed opposite to each other, the first roller and the second roller forming a gap to facilitate an electrode material to enter the gap and to be rolled into an electrode film, wherein
   the first roller has a cylinder and an inner cavity of the cylinder, the cylinder of the inner cavity is provided with a gas outlet structure, a surface of the cylinder of the first roller being provided with a circumferentially distributed cylinder gas discharge structure, the cylinder gas discharge structure comprises a plurality of gas discharge vents, the gas outlet structure is connected to a gas supply apparatus, the gas outlet structure is in fluid communication with the cylinder gas discharge structure, the gas outlet structure has holes dispersed on the inner cavity of the cylinder to facilitate the gas to be uniformly discharged from the surface of the cylinder of the first roller through the circumferentially distributed cylinder gas discharge structure;
   the first roller further comprises a first roller shaft having a hollow structure, the first roller shaft is removably inserted through the inner cavity of the cylinder of the first roller, a surface of the first roller shaft is provided with a circumferentially distributed roller shaft gas discharge structure comprising a plurality of gas discharge vents, an inner cavity of the first roller shaft is provided with a gas supply port, and the gas supply port is connected to the roller shaft gas discharge structure and the gas supply apparatus, a gas supplied by the gas supply apparatus to the gas supply port sequentially passes through the circumferentially distributed roller shaft gas discharge structure and the circumferentially distributed cylinder gas discharge structure to be discharged from the surface of the cylinder of the roller,
   the first roller further comprises two bearings and two bearing sealing disks, the two bearings are sleeved on the first roller shaft and respectively disposed on two ends of the first roller shaft, two ends of the cylinder of the first roller are detachably connected to the two ends of the first roller shaft via the two bearings respectively, when the first roller shaft rotates, the two bearings drive the cylinder of the first roller to simultaneously rotate, the two bearing sealing disks are sleeved on the first roller shaft and respectively disposed on the two ends of the first roller shaft and corresponding to the two bearings, the two bearing sealing disks are configured to avoid sliding of the bearings relative to the cylinder during rotation,
   a ratio of a total opening area of the gas discharge vents of the roller shaft gas discharge structure to a total opening area of the gas discharge vents of the cylinder gas discharge structure is greater than or equal to 1.05 and less than or equal to 1.5.

2. The apparatus for forming an electrode plate according to claim 1, wherein the cylinder of the first roller and the first roller shaft are hermetically sealed with an elastic sealing element.

3. The apparatus for forming an electrode plate according to claim 1, further comprising:
   a third roller disposed opposite the second roller, a gap being formed between the second roller and the third roller for rolling the electrode film and a substrate into a laminated electrode plate; and
   a substrate delivery assembly configured to deliver the substrate into the gap between the second roller and the third roller.

4. The apparatus for forming an electrode plate according to claim 3, wherein the first roller and the second roller are horizontally arranged side by side, and the third roller and the second roller are horizontally arranged side by side or vertically arranged.

5. The apparatus for forming an electrode plate according to claim 1, further comprising:
   two roller sets, either of the two roller sets comprising one such first roller and one such second roller, the two roller sets being arranged in mirror symmetry, the two second rollers in the two roller sets being disposed opposite each other in the center, and a gap being formed between the two second rollers for rolling the electrode film simultaneously on both sides of a substrate into a laminated electrode plate; and a substrate delivery assembly configured to deliver the substrate into the gap between the two second rollers.

6. The apparatus for forming an electrode plate according to claim 5, wherein the two first rollers and the two second rollers in the two roller sets are horizontally arranged side by side.

7. The apparatus for forming an electrode plate according to claim 1, further comprising:

a feeding assembly configured to supply the electrode material into the gap between the first roller and the second roller.

8. A roller for forming an electrode plate, the roller comprising:

a cylinder and a roller shaft, wherein, the cylinder has an inner cavity of the cylinder, the cylinder of the inner cavity is provided with a gas outlet structure, a surface of the cylinder of the roller being provided with a circumferentially distributed cylinder gas discharge structure, the cylinder gas discharge structure comprises a plurality of gas discharge vents, the gas outlet structure is connected to a gas supply apparatus, the gas outlet structure is in fluid communication with the cylinder gas discharge structure, the gas outlet structure has holes dispersed on the inner cavity of the cylinder to facilitate the gas to be uniformly discharged from the surface of the cylinder of the roller through the circumferentially distributed cylinder gas discharge structure, the roller shaft is removably inserted through the inner cavity of the cylinder of the roller and has a hollow structure, a surface of the roller shaft is provided with a circumferentially distributed roller shaft gas discharge structure comprising a plurality of gas discharge vents, an inner cavity of the roller shaft is provided with a gas supply port, and the gas supply port is connected to the roller shaft gas discharge structure and the gas supply apparatus, a gas supplied by the gas supply apparatus to the gas supply port sequentially passes through the circumferentially distributed roller shaft gas discharge structure and the circumferentially distributed cylinder gas discharge structure to be discharged from the surface of the cylinder of the roller, the roller further comprises two bearings and two bearing sealing disks, the two bearings are sleeved on the roller shaft and respectively disposed on two ends of the roller shaft, two ends of the cylinder of the roller are detachably connected to the two ends of the roller shaft via the two bearings respectively, when the roller shaft rotates, the two bearings drive the cylinder of the roller to simultaneously rotate, the two bearing sealing disks are sleeved on the roller shaft and respectively disposed on the two ends of the roller shaft and corresponding to the two bearings, the two bearing sealing disks are configured to avoid sliding of the bearings relative to the cylinder during rotation, a ratio of a total opening area of the gas discharge vents of the roller shaft gas discharge structure to a total opening area of the gas discharge vents of the cylinder gas discharge structure is greater than or equal to 1.05 and less than or equal to 1.5.

* * * * *